July 18, 1950  I. W. ELLSWORTH ET AL  2,515,641
ELECTRICALLY HEATED PLATE
Filed May 11, 1949

INVENTORS
Ivan W. Ellsworth
Roland O. Farrar
BY

Patented July 18, 1950

2,515,641

UNITED STATES PATENT OFFICE 2,515,641

ELECTRICALLY HEATED PLATE

Ivan W. Ellsworth, Belmont, and Roland O. Farrar, West Acton, Mass.

Application May 11, 1949, Serial No. 92,522

5 Claims. (Cl. 219—40)

This invention comprises a new and improved electrically heated hot plate constructed and arranged to vaporize a predetermined charge of water for both heating the plate and controlling the input to it of electrical energy.

In general, it is the object of the invention to provide a plate or container for food that may be at little expense automatically maintained at an elevated and substantially uniform temperature. I have discovered that very satisfactory results may be secured by a hot plate construction which includes a body portion having a flange and a disk secured within the flange and forming with the body portion a hermetically sealed chamber containing a shallow well for a charge of water, and spaced electric heating units effective to vaporize the water contained in the well, thereby at the same time heating the body portion of the plate and reducing the water level to the point of interrupting the heating circuit through the spaced units. The water vaporized by the units passes directly to the body of the plate where it is condensed in heating the plate. The water in the well serves to close an electric circuit through the spaced heating units. Accordingly, when the charge of water has been completely evaporated, the electrical circuit is interrupted and the supply of energy to the plate temporarily cut off. Then, as the plate begins to cool, the condensed vapor is directed back to the well, the units are again immersed, and the heating current again begins to flow. This cycle is repeated continuously and automatically, and it will be seen that by regulating the amount of water in the initial charge, the heating period of the cycle may be determined and the temperature of the heated plate thus governed and held within any desired range.

Optional but desirable features of the invention consist in providing the plate with a shallow circular chamber that tapers in width as it approaches its circumference and forming this chamber in part by a bottom surface of the plate which is concaved. Also preferably the top or ceiling of this chamber may be provided with pointed projections upon which the condensed vapor will accumulate and by which it will be directed back to the well occupied by the electric heating units.

Figure 1:
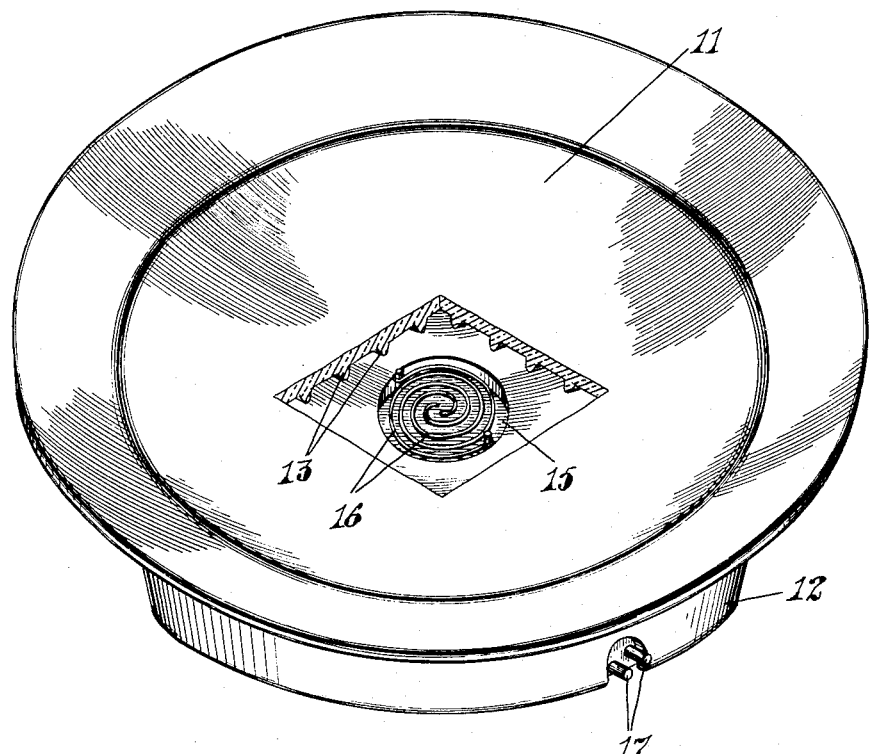
Figure 2:
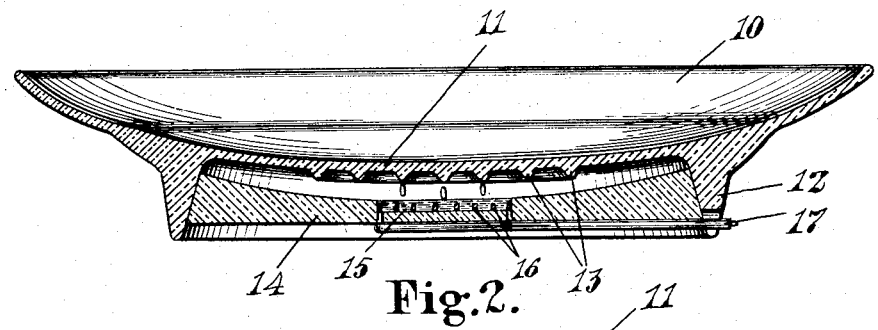
Figure 3:
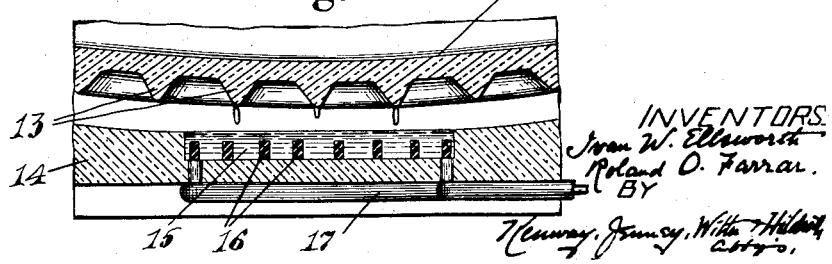

These and other features of the invention will be best understood and appreciated from the following description of a preferred embodiment thereof, selected for purposes of illustration and shown in the accompanying drawings in which:

Fig. 1 is a view in perspective of the plate showing a portion of its bottom broken away, Fig. 2 is a view of the plate in cross-section, and Fig. 3 is a fragmentary view in cross-section through the bottom of the plate.

It will be understood that while the invention may be embodied in a plate of more or less conventional shape, it is not limited thereto but may be embodied in receptacles of various shapes designed for keeping food or other products at a uniform elevated temperature.

The illustrated embodiment of the invention comprises a plate having a dished body 10 with a concave bottom 11 and a downwardly extending circular flange 12. As herein shown, the bottom of the plate is provided on its under surface with downwardly extended pointed ribs 13. These may be circular and arranged concentrically about a single centrally disposed conical projection. The plate may be constructed of porcelain, china, or any suitable plastic compound such as Vinylite or the like, and is so designed that it may be produced as a single integral piece.

A circular disk 14, preferably of the same material as the body of the plate and having its circumferential wall inclined to fit the inner surface of the flange, is permanently sealed in place so that it forms with the bottom 11 of the plate a circular hermetically sealed chamber tapering in width as it approaches its circumference. Centrally disposed in the disk 14 is a shallow circular well 15, and in this well is located a pair of spaced electric heating units. As herein shown, these units are of spiral shape and are separated throughout their length and between their ends. The heating units 16 are connected to terminals 17 which extend from each unit down through the disk 14 and then outwardly through a notch in the flange 12 in position to receive the conventional plug of a lamp cord or toaster. The disk 14 fits within the flange 12 so as to provide space for the terminal leads in a position suspended above the supporting surface upon which the plate rests.

Before sealing the disk 14 within the flange 12, a measured charge of water is placed in the sealed chamber. As herein shown this may substantially fill the well 15. When this water is heated by electrical energy transmitted to the heating units, the vapor rises, condenses upon the under surface of the plate bottom 11, and finally disappears from the well 15 to the extent of breaking the electrical circuit between the heating units 16. The vapor thus generated heats the bottom of the plate, condenses thereon, collects upon the projections 13, and eventually drips back into the well 15. As soon as the water level in the well rises sufficiently to immerse or partially immerse the heating units, the current through them is re-established and vaporization again begins. The interval of vaporization may be regulated in the first instance by measuring the charge of water sealed within the chamber. The greater the amount of charge, the longer will be the vaporizing and heating interval and the higher will be the temperature of the plate or dish.

Having thus disclosed our invention and described in detail an illustrative embodiment thereof, we claim as new and desire to secure by Letters Patent:

1. A heated plate comprising a body portion provided with a downwardly extending circular flange and a concave bottom with a pointed projection on its under face, a disk sealed within said flange and forming a closed shallow chamber with the body portion of the plate, said disk having a centrally disposed well located beneath the said pointed projection, and spaced electric heating units located in the well.

2. A heated plate as defined in claim 1 in which the shallow chamber tapers in width in approaching its circumference.

3. A heated plate as defined in claim 1 in which the heating units have terminal leads that extend outwardly through the circular flange of the plate.

4. A heated dish comprising a body portion having a flange and a disk secured within the flange and forming with the body portion an hermetically sealed chamber, a shallow well sunk in the inner face of the disk for containing a charge of water, and spaced electric heating units in the well effective to vaporize water contained in the well thereby heating the body portion of the plate and at the same time reducing the water level to the point of interrupting the heating circuit through the spaced units.

5. A heated dish as defined in claim 4 in which the upper face of the sealed chamber has projections so located as to collect and drop condensed vapor into the well.

IVAN W. ELLSWORTH.
ROLAND O. FARRAR.

REFERENCES CITED

The following references are of record in the file of this patent:

UNITED STATES PATENTS

| Number | Name | Date |
| --- | --- | --- |
| 1,293,964 | Spink | Feb. 11, 1919 |
| 1,987,381 | Twombly | Jan. 8, 1935 |
| 2,081,537 | Hanks | May 25, 1937 |
| 2,243,651 | Price | May 27, 1941 |
| 2,357,634 | Crites | Sept. 5, 1944 |
| 2,433,750 | Fisher | Dec. 30, 1947 |